United States Patent
Anders et al.

(10) Patent No.: US 11,657,235 B2
(45) Date of Patent: *May 23, 2023

(54) STATE OF EMOTION TIME SERIES

(71) Applicant: International Business Machines Corporation, Armonk, NY (US)

(72) Inventors: Kelley Anders, East New Market, MD (US); Jeremy R. Fox, Georgetown, TX (US); Jonathan Dunne, Dungarvan (IE); Liam S. Harpur, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 657 days.

This patent is subject to a terminal disclaimer.

(21) Appl. No.: 16/553,701

(22) Filed: Aug. 28, 2019

(65) Prior Publication Data
US 2020/0090067 A1 Mar. 19, 2020

Related U.S. Application Data
(63) Continuation of application No. 16/130,587, filed on Sep. 13, 2018.

(51) Int. Cl.
*G06N 7/00* (2023.01)
*G06N 20/00* (2019.01)
(Continued)

(52) U.S. Cl.
CPC ............... *G06N 7/00* (2013.01); *G06K 9/628* (2013.01); *G06K 9/6256* (2013.01); *G06N 5/02* (2013.01); *G06N 20/00* (2019.01); *G10L 25/63* (2013.01)

(58) Field of Classification Search
None
See application file for complete search history.

(56) References Cited

U.S. PATENT DOCUMENTS 7,007,067 B1 2/2006 Azvine et al.
7,921,369 B2 4/2011 Bill
(Continued)

OTHER PUBLICATIONS

Sano A, Johns P, Czerwinski M. Designing opportune stress intervention delivery timing using multi-modal data. In 2017 Seventh International Conference on Affective Computing and Intelligent Interaction (ACII) Oct. 2, 20173 (pp. 346-353). IEEE. (Year: 2017).*

(Continued)

*Primary Examiner* — Vincent Gonzales
(74) *Attorney, Agent, or Firm* — Maeve M. Carpenter; George S. Blasiak; Heslin Rothenberg Farley Mesiti P.C.

(57) ABSTRACT

Methods, computer program products, and systems are presented. The methods include, for instance: inputs of emotion time series data of a user and environmental factor data from one or more data collection device for a user assistance service. A baseline emotion time series is generated and an environmental factor that is likely to have affected changes in state of emotion on a subject is identified by regression analysis. An emotion time series model for the identified environmental factor is produced and prediction of a path to attain a target state of emotion at a certain time in the future is made. Recommendation to achieve the target state of emotion is produced based on the predicted path.

18 Claims, 10 Drawing Sheets

(51) Int. Cl.
  *G06N 5/02* (2023.01)
  *G10L 25/63* (2013.01)
  *G06K 9/62* (2022.01)

(56) References Cited

U.S. PATENT DOCUMENTS

| | | |
|---|---|---|
| 2013/0006064 A1 | 1/2013 | Reiner |
| 2014/0337436 A1 | 11/2014 | Hoagland et al. |
| 2015/0088542 A1 | 3/2015 | Balassanian |
| 2016/0232806 A1 | 8/2016 | Isaka |
| 2016/0253552 A1 | 9/2016 | Rihn et al. |
| 2017/0024656 A1 | 1/2017 | Gilon et al. |
| 2019/0215290 A1 | 7/2019 | Kozloski et al. |

OTHER PUBLICATIONS

Frees E, Regression Modeling with Actuarial and Financial Applications, Cambridge University Press, Cambridge, UK, 2010, 585 pages. (Year: 2010).*

Downey AB. Think stats. Ver. 2.1.0. Green Tea Press. 2014. 264 pages. (Year: 2014).*

Picard, RW. Affective computing. M.I.T Media Laboratory, Cambridge, MA. Nov. 1995. Available at: http://hd.media.mit.edu/tech-reports/TR-321.pdf. (Year: 1995).*

Santos OC. Emotions and personality in adaptive e-learning systems: an affective computing perspective. In Emotions and personality in personalized services 2016 (pp. 263-285). Springer, Cham. (Year: 2016).*

Fewzee P, Karray F. Continuous emotion recognition: Another look at the regression problem. In 2013 Humaine Association Conference on Affective Computing and Intelligent Interaction Sep. 2, 2013 (pp. 197-202). IEEE. (Year: 2013).*

P. Mell, et al. *"The NIST Definition of Cloud Computing"*, NIST Special Publication 800-145, Sep. 2011, Gaithersburg, MD.

Cecchinato et al., "Personalised email tools: a solution to email overload?" In: Personalizing Behavior Change Technologies: CHI 2014 Workshop. ACM Conference on Human Factors in Computing Systems (CHI): Toronto, Canada, 2014, 4 pages.

Anonymous, "Leveraging Semantic Analysis for Notification Management." IP.com Disclosure No. IPCOM000241338D, Publication Date: Apr. 17, 2015, 5 pages.

Anonymous, "Apparatus and Method for Intelligent Task Scheduling." IP.com Disclosure No. IPCOM000247129D, Publication Date: Aug. 9, 2016, 3 pages.

Anonymous, "Method for delivery of communication message based on individual's stress level and message intent." IP.com Disclosure No. IPCOM000247131D, Publication Date: Aug. 9, 2016, 3 pages.

Anonymous, "System and method for mapping biometric stress levels to computer activity." IP.com Disclosure No. IPCOM000237295D, Publication Date: Jun. 12, 2014, 4 pages.

Anonymous, "System and Method for Cognitive Shaping via Visual Analysis." IP.com Disclosure No. IPCOM000244312D, Publication Date: Dec. 1, 2015, 3 pages.

Anonymous, "Mood indicator based on history of electronic communication thread." IP.com Disclosure No. IPCOM000198194D, Publication Date: Jul. 29, 2010, 4 pages.

Yan et al., "A Biterm Topic Model for Short Texts", Institute of Computing Technology, CAS, Beijing, China, 11 pages.

List of IBM Patent and/or Patent Applications treated as related for U.S. Appl. No. 16/553,701, filed Aug. 28, 2019, dated Aug. 28, 2019.

Mark et al., "Email Duration, Batching and Self-interruption: Patterns of Email Use on Productivity and Stress." In Proceedings of the 2016 CHI Conference on Human Factors in Computing Systems (CHI '16). ACM, New York, NY, USA, pp. 1717-1728, 2016.

Gong, M. et al.; Causal discovery from temporally aggregated time series; Uncertain Artificial Intelligence; Aug. 2017; 22 pages.

Atcheson, M et al.; Gaussian process regression for continuous emotion recognition with global temporal invariance; IJCAI 2017 Workshop on Artificial Intelligence in Affective Computing; Sep. 15, 2017; pp. 34-44.

Final Office Action; U.S. Appl. No. 16/138,587, filed Sep. 13, 2018; dated Aug. 23, 2022; 15 pages.

* cited by examiner

600

| Parameter | Estimate | Standard Error | Interval (Simulated) | Antilog of Estimate(x) = e^x |
|---|---|---|---|---|
| Constant | 22.22 | 2.20 | 10.12 | 4478578096 |
| Factor1 | -0.45 | 1.05 | -9.94 | 0.00002887 *(0.63712815)* |
| Factor2 | 0.74 | 0.46 | 0.54 | 0.36237263 *(2.09593551)* |
| Factor3 | 0.86 | 0.96 | 1.05 | 0.67893439 *(2.36316069)* |

650

$$logit(p) = \log(\frac{p}{1-p})$$
$$= Constant + Factor1 + Factor2 + Factor3$$

FIG. 6

STATE OF EMOTION TIME SERIES

CROSS-REFERENCE TO RELATED APPLICATION

This application is a continuation of U.S. application Ser. No. 16/130,587, filed Sep. 13, 2018, titled "State of Emotion Time Series", which is incorporated by reference herein in its entirety.

TECHNICAL FIELD

The present disclosure relates to cognitive analytics and learning technology, and more particularly to methods, computer program products, and systems for modeling of a sentiment time series and forecasting thereby.

BACKGROUND

Occupational behaviors of employees are greatly affected by individual well-being, both physical and emotional. Conventionally, some forms of employee assistance program such as counseling and therapy exist in order to support grave stress on employees by corporates. Individual employees receive a speech from a manager according to their respective personal propensities and react differently, ending up in distinctive states of emotion after the same event. For example, the speech may upset one employee and reduces work performance afterward, while the same speech can motivate another employee and promotes work performance of the employee. Also, for some people, emotional effects of a certain event wear off quickly, while other people are affected more severely and for a longer period of time.

SUMMARY

The shortcomings of the prior art are overcome, and additional advantages are provided, through the provision, in one aspect, of a method. The method includes, for instance: obtaining, by one or more processor, inputs of emotion time series data of a user and environmental factor data from one or more data collection device for a user assistance service; generating, by the one or more processor, a baseline emotion time series based on the inputs from the obtaining; ascertaining, by the one or more processor, one or more environmental factor affecting states of emotion as represented in the emotion time series by regression analysis; building, by the one or more processor, an emotion time series model for one of the one or more environmental factor from the ascertaining; predicting, by the one or more processor, one or more path to a target state of emotion at a target time in the future on the emotion time series model; and producing, by the one or more processor, a recommendation specifying one or more activity to perform for the user in order to attain the target state of emotion at the target time.

Additional features are realized through the techniques set forth herein. Other embodiments and aspects, including but not limited to computer program products and systems, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 6 depicts an exemplary time series forecasting, in accordance with one or more embodiments set forth herein;

DETAILED DESCRIPTION

Figure 1:
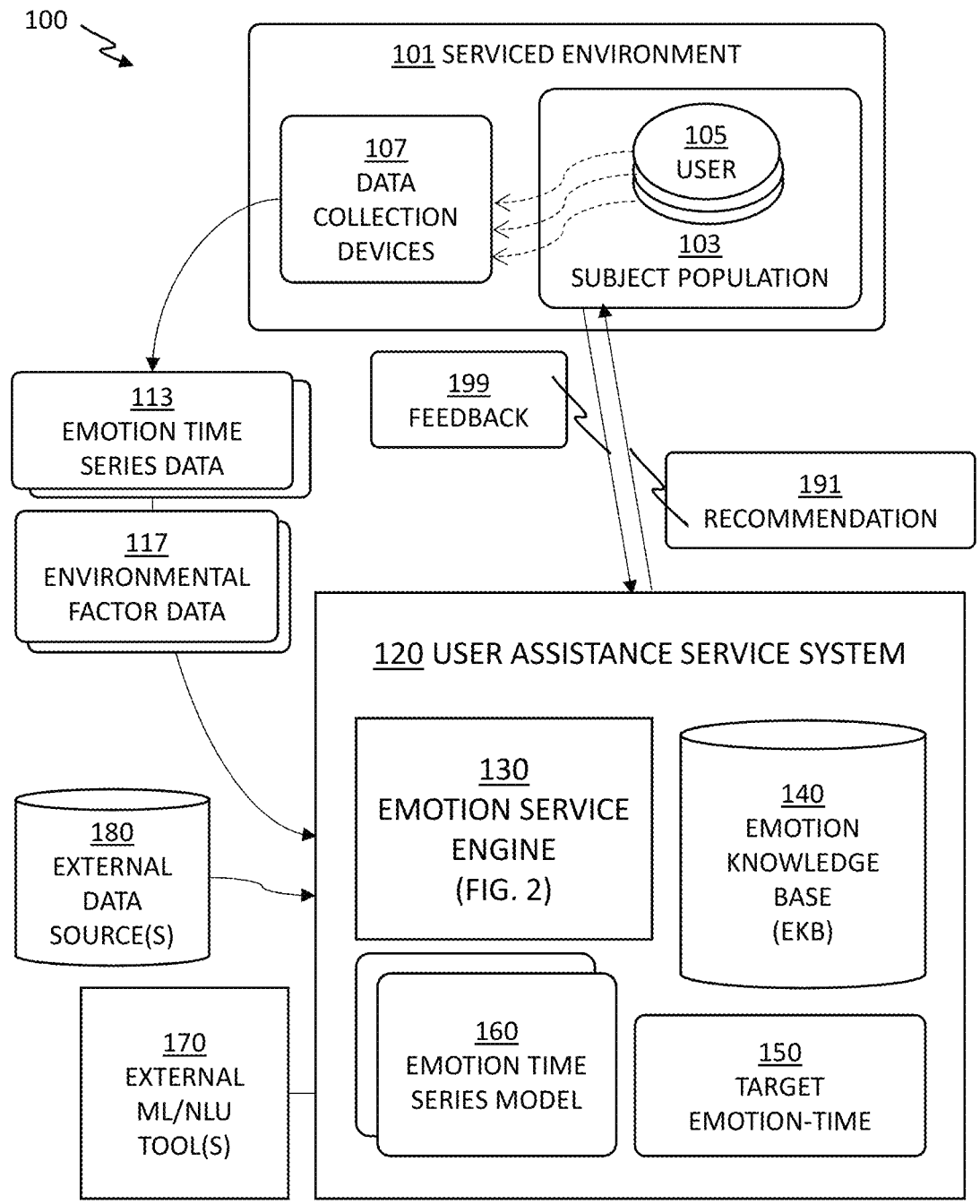
FIG. 1 depicts a system for providing user assistance services regarding states of emotion, in accordance with one or more embodiments set forth herein.

FIG. 1 depicts a system 100 for providing user assistance services regarding states of emotion, in accordance with one or more embodiments set forth herein.

Embodiments of the present invention recognize that occupational behaviors of members of an organization are greatly affected by both physical and emotional well-being of individual employees, and accordingly, productivity of the organization. It is well established that people are more productive when in a positive mood rather than when they are in negative mood, particularly in industries where creative effort is essential. Accordingly, organizations run various incentives and employee assistance programs to support employees and, consequently, to improve both job satisfaction of the employees and productivity of the organizations as a result.

Although it is desirable to keep a positive mood in a workplace, respective states of emotion for each individual is difficult to understand and to predict the progression thereof. Emotions are affected by various factors in distinctive ways and degrees, and numerous factors that contribute to respective elements of emotions may simultaneously affect an individual. Also, every individual reacts to and is affected by respective events differently.

In this specification, terms "emotion" is used to indicate general feeling of an individual. An individual user is in a state of emotion consisting of a preselected basic emotions. Embodiments of the present invention acknowledge that, in psychological nomenclature, the term "sentiment" indicates a mental attitude, opinion, judgment or evaluation on a certain topic, whilst the term "emotion" refers to general feelings, and more specifically, a natural instinctive state of mind deriving from one's circumstances, mood, or relationships with others. Embodiments of the present invention are based on a psychological framework using five (5) basic emotions of joy, sadness, anger, fear, and disgust as elements of a state of emotion of a person. Embodiments of the present invention recognize that other frameworks using more or less basic emotions are also available. Also in this specification, terms "environmental factor", "factor" and "events" are used interchangeably to indicate certain causes, temporal or prolonged, for changes in a state of emotions for a person, or collectively for an organization. Also a certain "activity", or "action", of the person, or the organization, is regarded as respective causes for changes in a state of emotions for the same.

The system 100 includes a serviced environment 101 and a user assistance service system 120. The serviced environment 101 includes a subject population 103, indicating one or more user 105 who is provided with a user assistance service as provided by the user assistance service system 120. The serviced environment 101 also includes a plurality of data collection devices 107 which gathers data to support the user assistance service from the subject population 103.

The data collection devices 107 generate inputs of emotion time series data 113 and environmental factor data 117 and sends the same to the user assistance service system 120. In this specification, term "time series" indicates a series of data points indexed, listed, or graphed in a chronological order, and term "time series data" indicates respective data points in the series. Examples of the emotion time series data 113 include, but are not limited to, emails, chat texts, blood pressure measurements, heartrate measurements, voice stress levels, and facial images. Examples of the environmental factor data 117 include, but are not limited to, an application program which a user 105 is actively using, a location of the user 105 represented as global positioning system (GPS) coordinates, and date and time of respective observations.

The user assistance service system 120 includes an emotion service engine 130, an emotion knowledge base (EKB) 140, and a target emotion-time value pair 150. The emotion service engine 130 processes the input data 113, 117 by use of external machine learning or natural language understanding (ML/NLU) tools 170 coupled to the user assistance service system 120. The emotion service engine 130 builds one or more emotion time series model 160 based on the input data 113, 117, and content of the EKB 140. Each emotion time series model 160 represents the pattern of change in the state of emotion for the user 105, or in the state of collective emotion of the subject population 103, per environmental factor. The content of the EKB 140 include, but not limited to, a variety of knowledge on how to interpret the inputs in the context of the state of emotion, a list of activities that are established to have a certain effect on the state of emotion for an individual user or for general public for recommendation, past recommendations and feedbacks, as well as data from external data sources 180 that are likely to affect the emotion time series model 160. Examples of the external data sources 180 include, but are not limited to, a press release regarding a fiscal year revenue report of an organization represented by the serviced environment 101, news regarding the structure of the organization such as a merger and acquisition, a company picnic, an office party, announcement of new hires or retirements, a news report involving people close to the user 105, local news on neighborhood of the user 105, or the similar that can affect the morale/collective mood in the serviced environment 101 or the individual state of emotions for the user 105.

The emotion service engine 130 generates a recommendation 191 for the user 105 and sends the recommendation 191 to the user 105. The recommendation 191 includes one or more activity for the user 105 to perform. In this specification, terms "remediation step(s)", "remedial action(s)", or "recommendation" are used interchangeably to indicate the activities prescribed in the recommendation 191 for the purpose of timely attaining a target state of emotion for the user 105. The user 105 receives the recommendation 191 and acts on the received recommendation 191. The user 105 sends a feedback 199 assessing effectiveness of the recommendation 191 in timely attaining the target state of emotion for the user 105, as specified in the target emotion-time value pair 150. The emotion service engine 130 subsequently trains the emotion time series model 160 with the recommendation 191 and the feedback 199 by machine learning. Detailed operations of the emotion service engine 130 are presented in FIG. 2 and corresponding description.

The user assistance service system 120 provides individualized assistance regarding a state of emotion for users 105 in the subject population 103, to attain a certain state of emotion at a specific time as in the target emotion-time value pair 150, by modeling moment-to-moment state of emotion of respective users 105 and effects of various environmental factors as the emotion time series model 160. By use of the emotion time series model 160, the emotion service engine 130 dynamically ascertains the state emotion of the user 105 at a certain time. The emotion service engine 130 predicts the state emotion of the user 105 individually at another time in the future, based on both personal baseline emotion time series model and multilinear time series models depicting how respective environmental factors affect the user 105 over a certain period of time. The emotion service engine 130 further generates the recommendation 191 in order to align the predicted state of emotion with the target emotion-time value pair 150 at a certain time.

In the user assistance service system 120, the state of emotion is quantified as emotion score, and the emotion time series model 160 is represented as a function of time, an environmental factor, and a baseline. The emotion service engine 130 establishes respective baselines for each user 105, and calculates a baseline for the subject population 103 as a statistical mean of all individual baselines. In this specification, term "baseline" indicates emotion time series as developed from the emotion time series data 113 without being affected by the environmental factors, or without taking the environmental factor data 117 into account.

Figure 2:
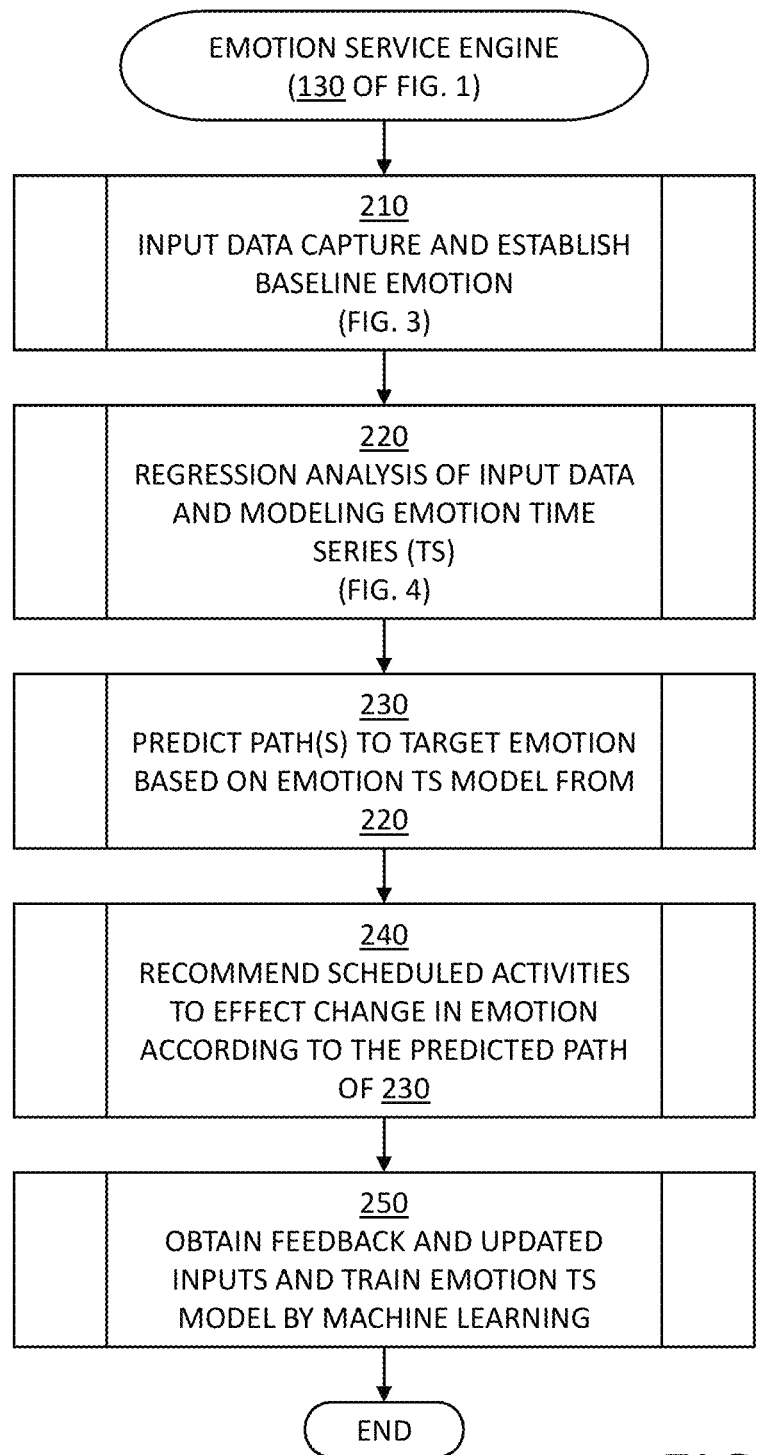
FIG. 2 depicts a flowchart of operations performed by the emotion service engine, in accordance with one or more embodiments set forth herein.

FIG. 2 depicts a flowchart of operations performed by the emotion service engine 130, in accordance with one or more embodiments set forth herein.

In block 210, the emotion service engine 130 obtains inputs of the emotion time series data 113 of a user 105, the environmental factor data 117, and relevant external data, from the data collection devices 107 and the external data sources 180. The emotion service engine 130 processes the inputs for modeling the emotion time series of the user 105, quantifies as respective emotion scores, and subsequently establishes a baseline emotion time series. Detailed operations of block 210 by the emotion service engine 130 are presented in FIG. 3 and corresponding description. Then, the emotion service engine 130 proceeds with 220.

In block 220, the emotion service engine 130 performs regression analysis on the input data obtained from block 210 in order to identify respective effects of each environmental factor on the state of emotion of the user 105, by use of logistic regression. The emotion service engine 130 subsequently builds the emotion time series model 160 based on the input data. In certain embodiments of the present invention, the interval of occurrences between events affecting the state of emotion is modeled by probability density function. In the same embodiments of the present invention, changes with the state of emotion in the emotion time series model is modeled by standard distribution. Detailed operations of block 220 by the emotion service engine 130 are presented in FIG. 4 and corresponding description. Then, the emotion service engine 130 proceeds with 230.

In block 230, the emotion service engine 130 predicts one or more probable path to the target emotion-time 150 based on the emotion time series model built in block 220. In certain embodiments of the present invention, the emotion service engine 130 generates a multilinear graph corresponding to the baseline emotion time series for the user 105 in block 220, where x-axis represents time and y-axis represents the emotion scores. The emotion service engine 130 marks the target emotion-time 150 as a point on the same two-dimensional space as the baseline emotion time series graph, and then, determines the path from a state of emotion on the baseline time graph at present time ($T_0$) to the target emotion-time point at a time in the future specified in the target emotion-time ($T_1$). The emotion service engine 130 subsequently examines the distance between the baseline emotion time graph and the point corresponding to the target emotion-time 150. Then, the emotion service engine 130 proceeds with 240.

In one embodiment of the present invention, the emotion service engine 130 predicts the path to the target emotion-time 150 from a present state of emotion, based on the baseline emotion time series graph and the environmental factors analyzed from block 220, by use of respective emotion score. The emotion service engine 130 identifies one or more environmental factor, simply referred to as a factor, which is likely to cause changes in the emotion score. The emotion service engine 130 utilizes time series prediction, or time series forecasting, to predict future values of the emotion time series based on previously observed values by use of the emotion time series model built in block 220.

Once the emotion service engine 130 identifies the environmental factor causing the changes in the state of emotions, then the emotion service engine 130 overlays the emotion score of the identified factor on the emotion score graph of the baseline emotion time series.

Table 600 of FIG. 6 exemplifies a model derived for identifying factors affecting a basic emotion of Joy. Details of the items in Table 600 and Equation 650 are presented in FIG. 6 and corresponding description.

In block 240, the emotion service engine 130 determines which environmental factor would cause the baseline emotion time graph to move close to the point of the target emotion-time 150. If the emotion service engine 130 ascertains one or more known environmental factor that will move the baseline emotion time graph toward the point of the target emotion-time 150 within a certain threshold distance of the target emotion-time point, then the emotion service engine 130 generates the recommendation 191 including activities respective to the ascertained environmental factor for the user 105. The emotion service engine 130 subsequently delivers the generated recommendation 191 to the user 105 via a preconfigured channel. Then, the emotion service engine 130 proceeds with 250.

In certain embodiments of the present invention, the emotion service engine 130 combines the baseline emotion time series graph with another multilinear graph representing a time series of an environmental factor, in order to generate another emotion time series as affected by the environmental factor, and to predict the path to the target emotion-time point on the generated emotion time series graph. An example of prediction on a combined multilinear graph and the recommendation 191 to achieve the target emotion-time 150 is presented in FIG. 9 and corresponding description.

In certain embodiments of the present invention, the emotion service engine 130 provides a set of remediation steps to attain the target emotion-time 150, by using the mean time between the two distinctive states of emotion and the factors that contribute to a state of emotion at an earlier time. An example of the remediation steps may be, but are not limited to, to include chat bot posting in the user workflows seeking suggestions, based on that the chat bot posting has been analyzed and modeled as a factor contributing to the target emotion-time 150, by way of respective contributing to a selected subset of the basic emotions that are elements of the target emotion.

In certain embodiments of the present invention, the emotion service engine 130 configures remedial actions to attain the target emotion-time 150 respective to each basic emotion, and respective to each factor.

A few examples of the remediation steps further include, but are not limited to, taking a walk/water break, or doing yoga, or any other personally preferred activities to attain a refreshed state of emotion, to promote a more efficient work performance; scheduling a much anticipated event/meeting, or performing tasks relevant to such occasion; viewing cute, funny, or any other amusing content, such as cartoon, pet video, or quote of the day, for a short period of time to promote general sense of happiness, which corresponds to a high emotion score. Remediation steps can be selected from activities stored in the EKB 140, or can be configured to a certain personalized activities specific for the user 105. The EKB stores 140 activities known to promote a relaxed and positive state of emotion, specifically for the user 105 or for general public having demographic similar to the user 105, or group of users in the subject population 103.

The emotion service engine 130 delivers the recommendation to the user 105 by use of preconfigured methods for the serviced environment 101, the subject population 103, or for individual users. For example, the emotion service engine 130 sends a chat message "How about taking a walk for 5 minutes? The weather is beautiful today!" The emotion service engine 130 also can send an email with multimedia content/link "This little kitten video went viral. Want to check out? Click here." The emotion service engine 130 can also modify the calendar of the user 105 by adding additional alerts for an existing schedule or generating a new event on the calendar, with a notice "Don't forget the office outing is this Friday! Two more days to go!" or "The quarterly report is due in two weeks. Please have it ready by next Wednesday for a review before the presentation!"

In block 250, the emotion service engine 130 obtains a feedback 199 on effectiveness of the recommendation 191 from the user 105. The emotion service engine 130 also obtains updates on the emotion time series data 113 from the data collection devices 107. The emotion service engine 130 trains the emotion time series model 160, by machine learning with the updated inputs and/or the feedback 199 from the user 105, in order to improve accuracy of the emotion time series model 160 with the time progression of the baseline as well as the predictions. Then, the emotion service engine 130 terminates processing the input data. The emotion service engine 130 repeats blocks 210 through 250 when preconfigured conditions for re-processing are met, including, but not limited to, cumulating a predefined amount of input data, obtaining a new instance of the target emotion-time value pair 150, etc.

Figure 3:
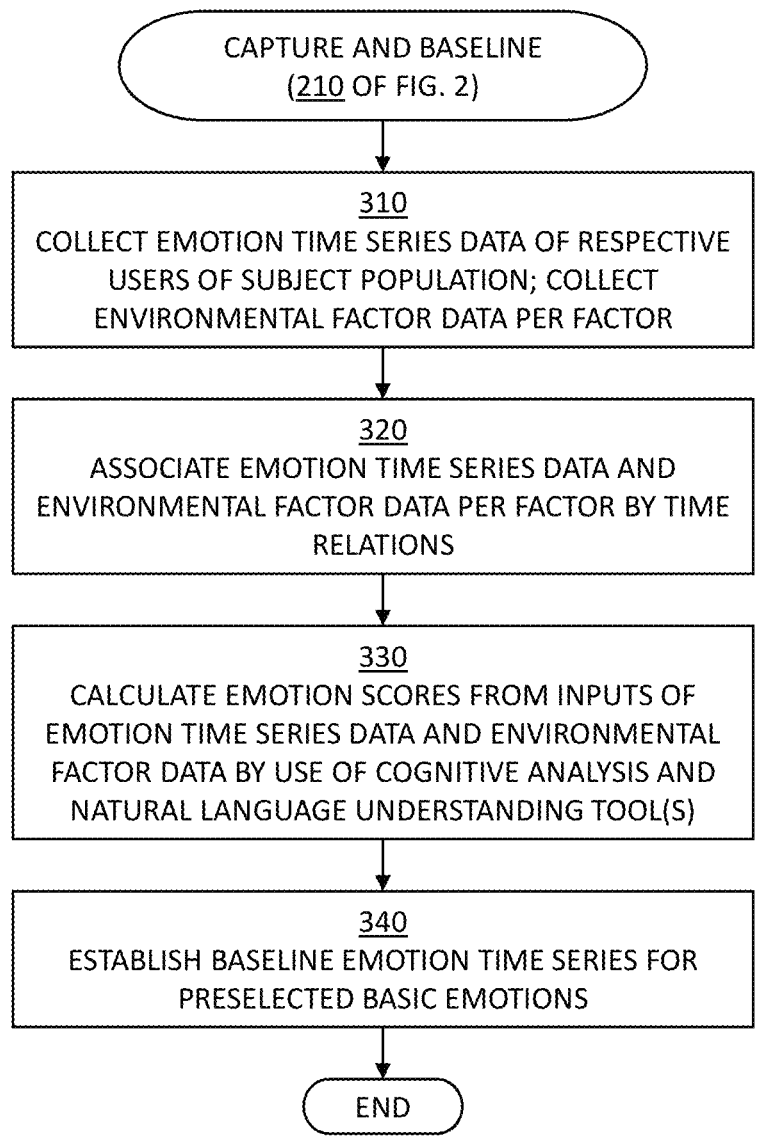
FIG. 3 depicts a flowchart for input data collection and establishing the baseline emotion time series as performed in block 210 of the emotion service engine, in accordance with one or more embodiments set forth herein.

FIG. 3 depicts a flowchart for input data collection and establishing the baseline emotion time series as performed in block 210 of the emotion service engine 130, in accordance with one or more embodiments set forth herein.

In block 310, the emotion service engine 130 collects and processes the emotion time series data 113 of respective users 105 of the subject population 103 and the environmental factor data 117 from the data collection devices 107 in the serviced environment 101. The emotion service engine 130 quantifies the input data as respective emotion scores according to preconfigured emotion score scheme. Then, the emotion service engine 130 proceeds with block 320.

The emotion time series data 113 include, but are not limited to, verbal/linguistic expressions of emotion by the user 105, verbal/linguistic expressions of emotion by respective users in the subject population 103, biometric measurements of the user 105, biometric measurements of respective users in the subject population 103, facial images of the user 105, facial images of respective users in the subject population 103. Examples of verbal/linguistic expressions of emotion include, but are not limited to, speech, emails, and chat messages. Examples of biometric measurements include, but are not limited to, blood pressure, heartrate, perspiration, voice stress level.

In certain embodiments of the present invention, the emotion service engine 130 processes the collected text contents and classifies the text contents into certain categories indicative of states of emotion, by use of the external natural language understanding tools 170, which includes topic modeling tools. All emotion time series data 113 are respectively associated with a unique time stamp that records the time upon which the emotion time series data 113 had been observed/collected on the user 105.

Similarly in block 310, the emotion service engine 130 collects the environmental factor data 117 for each factor accounted in a plurality of environmental factors. The emotion service engine 130 performs the data collection of the emotion time series data 113 and the environmental factor data 117, preferably in parallel, upon respective data being generating. Similarly with the emotion time series data 113, each instance of the environmental factor data 117 is associated with a unique time stamp that records the time upon which the environmental factor 117 had occurred or otherwise known to the user 105.

In certain embodiment of the present invention, the emotion service engine 130 simultaneously collects the emotion time series data 113 for all users in the subject population 103 to accommodate analysis of a cumulative effect of certain environmental factor on a general state of emotion for all users in the subject population 103. The emotion service engine 130 subsequently stores and processes the emotion time series data 113 per user in distinctive execution thread by parallel processing.

Examples of the environmental factor data 117 include, but are not limited to, an application program which the user 105 is using, a location of the user 105 represented as global positioning system (GPS) coordinates, and date and time of respective observations. The environmental factor data 117 may also include, a scheduled event stored in a calendar application of the user 105 such as a business conference, a project meeting, or any other work related activities on the calendar as well as personal appointments and activities in the calendar.

Also in block 310, the emotion service engine 130 further collects data from the external data sources 180 that can affect the state of emotion for the user 105, such as a press release, a news report, or any other type of data regarding status and events of the organization corresponding to the serviced environment 101, and information on people known to the user 105, which may be used to build a emotion time series for the user 105. For example, because a good fiscal year revenue report for the organization may implicate an upcoming bonus for the user 105, and accordingly, changes in emotion by the user 105 is expected when the user 105 hears the report, the emotion service engine 130 includes the revenue report in the environmental factor data 117. For another example, if a local news report on a car accident/fire involves a family member of the user 105, the emotion service engine 130 collects the local news report for building a baseline state of emotion for the user 105. In certain embodiments of the present invention, the emotion service engine 130 is configured with user profiles, or filters, respective to the user 105 for screening the information coming from the external data sources 180, such as names of organizations, family members, and friends, names of interested cities and neighborhoods, and keywords identifying areas of interest for the user 105.

In certain embodiment of the present invention, the emotion service engine 130 quantifies the input data to respective emotion scores. Where the emotion service engine 130 utilizes a framework with five (5) basic emotions of Joy, Sadness, Fear, Disgust, and Anger, for the user assistance service system 120, the emotion service engine 130 scales Joy as positive and the rest as negative. The emotion service engine 130 scales the emotion scores for respective basic emotions such that the emotion score (ES) greater than one (1) indicates a positive state of emotions, that ES equal to zero (0) indicates a neutral state of emotions, and that ES less than minus one (−1) indicates a negative state of emotions.

In block 320, the emotion service engine 130 associates the emotion time series data 113 and the environmental factor data 117 per factor by time relations. The inputs of the emotion time series data 113 and the environmental factor data 117 are marked by respective time stamps. The emotion service engine 130 relates significantly simultaneous emotion time series data and environmental factor data with one another, in order to simulate a time series of an environmental factor with the input of the environmental factor data 117. For example, the environmental factor data 117 of GPS location is not inherently a time series if the emotion service engine 130 collects the GPS location coordinates in event-driven manner, indicating that the GPS location coordinate of the user 105 is updated only when the user 105 moves around or goes somewhere. If the user 105 is a computer programmer, the user 105 would not move around much during the course of the day in a place of work, and accordingly, the emotion service engine 130 does not have a time series of the GPS location coordinates of the user 105 with the raw input data. Then, the emotion service engine 130 proceeds with block 330.

In block 330, the emotion service engine 130 calculates respective emotion scores from the inputs of the emotion time series data 113 and the environmental factor data 117, as collected from block 310. The emotion service engine 130 utilizes various tools including, but not limited to, cognitive analysis tools, natural language understanding tools available for classification, keyword/topic extraction, and any other preconfigured measure for quantifying the inputs into respective emotion scores. In certain embodiments of the present invention, the emotion service engine 130 has a preconfigured rules for assigning the emotion score to a natural language text, by use of a pre-classified catalogues per each basic emotion, such that the user 105 uses a certain words from the basic emotion vocabulary catalogues, or any other words related with the words from the catalogues, then the corresponding basic emotions are weighted and reflected in the emotion score of the user 105 at the time. Also, the emotion service engine 130 quantifies respective emotion scores for the environmental factor data 117 by associating the environmental factor data 117 with significantly simultaneous emotion time series data 113 collected from the user 105. For example, if the emotion service engine 130 observes that the user 105 is getting excited for a craft class after work beginning three (3) o'clock in the afternoon on Thursdays, then the emotion service engine 130 can associate the time and day with an emotion score higher than the same time on other days. Then, the emotion service engine 130 proceeds with block 340.

In block 340, the emotion service engine 130 establishes a baseline emotion time series for preselected basic emotions. The emotion service engine 130 builds respective graphs for each basic emotions in the baseline emotion analysis. Then, the emotion service engine 130 proceeds with block 220 of FIG. 2, or block 410 of FIG. 4.

In certain embodiments of the present invention, the emotion service engine 130 stores the input data as well as the baseline emotion time series in a relational database tables with key fields such as SQL, or an object-oriented notation wrapper with attributes such as JSON. The emotion service engine 130 stores the input data and the baseline emotion time series as indexed per individual user 105, per group of users, or for the subject population 103.

Figure 5:
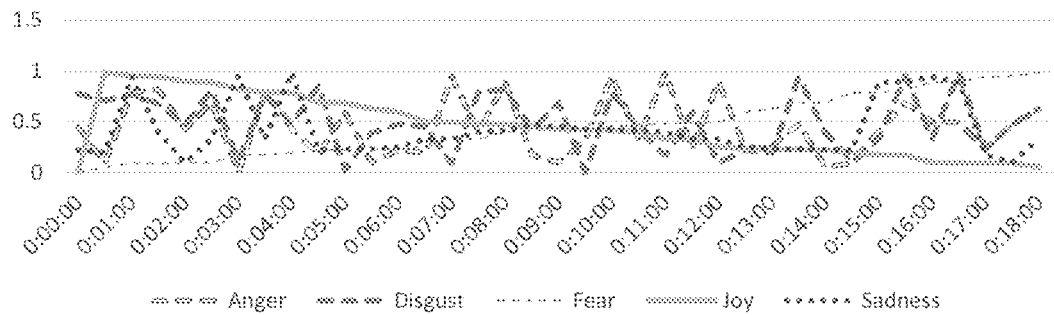
FIG. 5 depicts exemplary baseline emotion time series model graphs, in accordance with one or more embodiments set forth herein.
Figure 5:
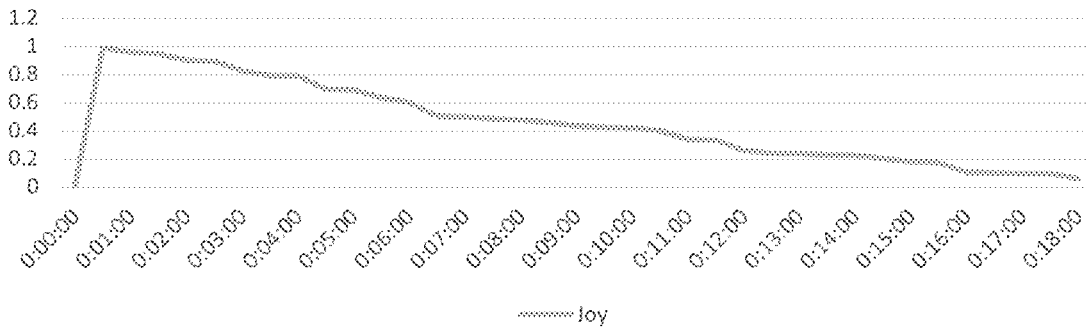

An example of the emotion time series graph 500 is presented in FIG. 5, wherein each basic emotions of Joy, Sadness, Fear, Disgust, and Anger are distinctively marked with their respective absolute values of the emotion scores. The basic emotion time series on Joy 510 is a separate depiction of Joy graph from the emotion time series 500.

Figure 4:
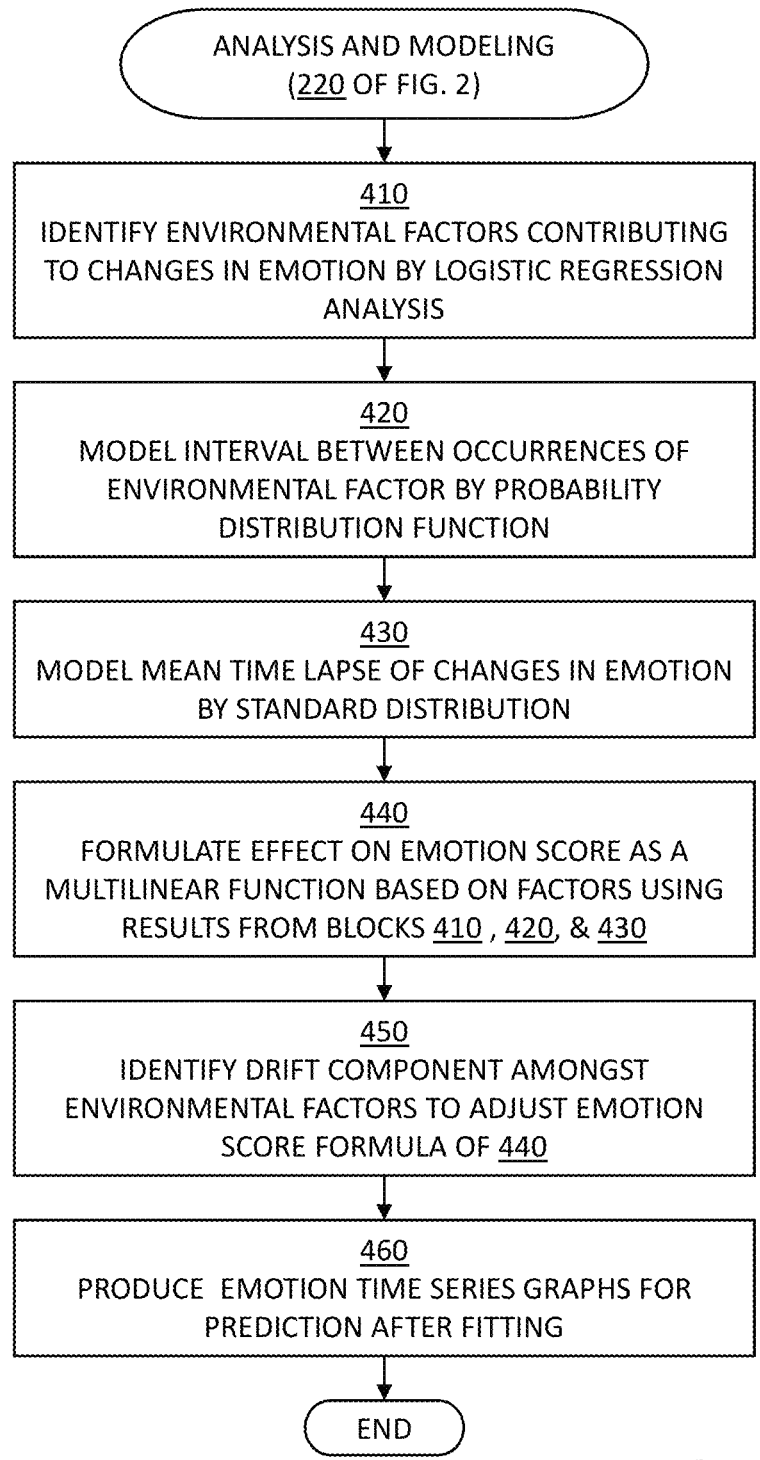
FIG. 4 depicts a flowchart for analysis and modeling of the emotion time series as performed in block 220 of the emotion service engine, in accordance with one or more embodiments set forth herein.

FIG. 4 depicts a flowchart for analysis and modeling of the emotion time series as performed in block 220 of the emotion service engine 130, in accordance with one or more embodiments set forth herein.

In block 410, the emotion service engine 130 identifies environmental factors contributing to changes in emotion by performing regression analysis of the emotion time series and environmental factors coincided with occurrences of the emotion time series data. Logistic regression is also referred to as a logit regression. In certain embodiments of the present invention, the emotion service engine 130 hypothesizes that a certain environmental factor affects a specific basic emotion time series by pairing up likely combinations, and then subsequently tests the respective hypotheses by checking against the input data. The emotion service engine 130 later utilizes identified environmental factors as independent variables, or predictor variables, upon which the changes for states of emotion depend. Then, the emotion service engine 130 proceeds with block 420.

Embodiments of the present invention recognize that logistic regression is appropriate when a response variable of the model is categorical with binary outcomes, as in the case of one (1) or zero (0), which is a typical representative set of values for most binary outcome cases such as True/False, Head/Tail. Binary variables can be introduced using an indicator variable Yi, taking on values 0 or 1, and modeled using a binomial distribution with probability $P(Y_i=1)=i$. The indicator variable is also referred to as a dummy variable, a design variable, Boolean indicator, binary variable, or qualitative variable in statistical context. The indicator variable takes either the value one (1) or zero (0) in order to indicate the presence or absence, respectively, of a certain categorical effect that can be expected. Embodiments of the present invention recognize that logistic regression analysis models the probability of the certain effect being present by use of the indicator variable as a function of one or more explanatory variables.

In block 420, the emotion service engine 130 models intervals between occurrences of the environmental factors by probability density function based on the timestamp values of the environmental factor data 117. Then, the emotion service engine 130 proceeds with block 430.

In block 430, the emotion service engine 130 models mean time lapse of changes in states of emotion by use of the standard distribution based on the timestamp values of the emotion time series data 113. The mean time lapse of changes in states of emotion indicates an average interval between changes with states of emotion as caused by the identified environmental factor. Then, the emotion service engine 130 proceeds with block 440.

Blocks 420 and 430 are performed to create respective time series based on the emotion time series data 113 and the environmental factor data 117, in order to simulate how often the respective time series data would be sampled.

In block 440, the emotion service engine 130 formulates how to calculate a log probability of which of the basic emotions is affected by the one or more factor identified in block 410, as a multilinear function of the one or more environmental factor. An example of the log probability formula and exemplary procedure are presented in FIG. 6 and corresponding description. Then, the emotion service engine 130 proceeds with block 450.

In block 450, the emotion service engine 130 identifies drift components amongst the environmental factors to adjust the log probability formula from block 440. Then, the emotion service engine 130 proceeds with block 460.

The drift, or a stochastic drift, indicates the change of average value of the emotion time series data. In order to keep the average value constant, the emotion service engine 130 configures a negative weighting as a drift component for environmental factors affecting the emotion time series positively, and vice versa.

In block 460, the emotion service engine 130 produces emotion time series graphs for prediction, subsequent to fitting the emotion time series graph with the drift component identified from block 450. In certain embodiments of the present invention, the emotion service engine 130 produces respective emotion time series graphs for each basic emotion, modeling how a certain environmental factor affects a specific basic emotion. Then, the emotion service engine 130 proceeds with block 230 of FIG. 2.

FIG. 5 depicts exemplary baseline emotion time series model graphs, in accordance with one or more embodiments set forth herein.

Emotion Time Series graph 500 depicts baseline emotion time series respective to five (5) basic emotions of Anger, Disgust, Fear, Joy, and Sadness, as recorded by the emotion service engine 130 based on the input data 113, 117. Y-axis of the Emotion Time Series graph 500 represents normalized emotion scores between zero (0) and one (1) for respective basic emotions. X-axis of the Emotion Time Series graph 500 represents time progression with the respective basic emotions.

In certain embodiments of the present invention, the emotion service engine 130 can produce the Emotion Time Series graph 500 in a form of a cumulative emotion score on y-axis representing respective contributions of each basic emotion.

Basic Emotion Time Series: Joy graph 510 depicts a baseline emotion time series for the basic emotion of Joy, which is isolated from the rest of basic emotions in order to show the time series graph without interference. Y-axis of the Basic Emotion Time Series: Joy graph 510 represents normalized emotion scores between zero (0) and one (1) for the basic emotion of Joy. X-axis of the Basic Emotion Time Series: Joy graph 510 represents a time progression with the basic emotion of Joy.

FIG. 6 depicts an exemplary time series forecasting, in accordance with one or more embodiments set forth herein.

Table 600 represents exemplary values for four (4) parameters of the log probability formula, as used by the emotion service engine 130 as formulated in block 440 of FIG. 4. According to logistic regression on the input data, the emotion service engine 130 calculates the log probability for the basic emotion of Joy, that is, P=Joy, is affected by the constant and the three factors of factor1, factor2, and factor3. Each factor represents a corresponding environmental factor from the input data. Although not shown in the specification, the emotion service engine 130 can similarly calculate the respective log probabilities for each of the basic emotion by use of respective multilinear functions.

Equation 650 predicts changes in the basic emotion of Joy, by using three (3) factors of Factor1, Factor2, and Factor 3 as independent variables. A probability value that the basic emotion of Joy is between zero (0) and one (1), and formulated as Equation 650. The relation amongst the factors and the subject of prediction is suitable for logistic regression modeling. The emotion service engine 130 utilizes currently available modeling tools and techniques such as glm( ) function in R statistical programming language and supporting tool suites in certain embodiments for identifying certain factor(s) affecting the changes of the emotion. The glm( ) function is for generalized linear modeling, and by assigning certain parameters of the glm( ) function with a preconfigured and/or user-specific values, the emotion service engine 130 performs logistic regression analysis on the input data 113, 117, and ascertains which factors have statistical significances for predicting an emotion score in the future.

By using the values in the "Estimate" column, the emotion service engine 130 creates a fitted regression graph as below:

$$logit(p) = \log\left(\frac{p}{1-p}\right) = 22.22 - 10.45 \times Factor1 + 1.34 \times Factor2 + 2.56 \times Factor3$$

The emotion service engine 130 then substitute values from Table 600 to obtain a value for Equation 650. The result is:

$$logit(p) = \log\left(\frac{p}{1-p}\right) = 22.22 - 0.45 \times 345 + 0.76 \times 100 + 0.64 \times 100 = 6.97$$

$$\therefore \frac{p}{1-p} = e^{6.97} = A, p = \frac{A}{1+A} = \frac{1064.222751}{1+1064.222751} = 0.999061033,$$

indicating that the likelihood the factors of Factor1, Factor2, and Factor3 to affect the emotion of Joy is approximately one (1). Accordingly, the emotion service engine 130 can predict, with 99.9% certainty, that the factors in the log probability formula affects the basic emotion of Joy.

Figure 7:
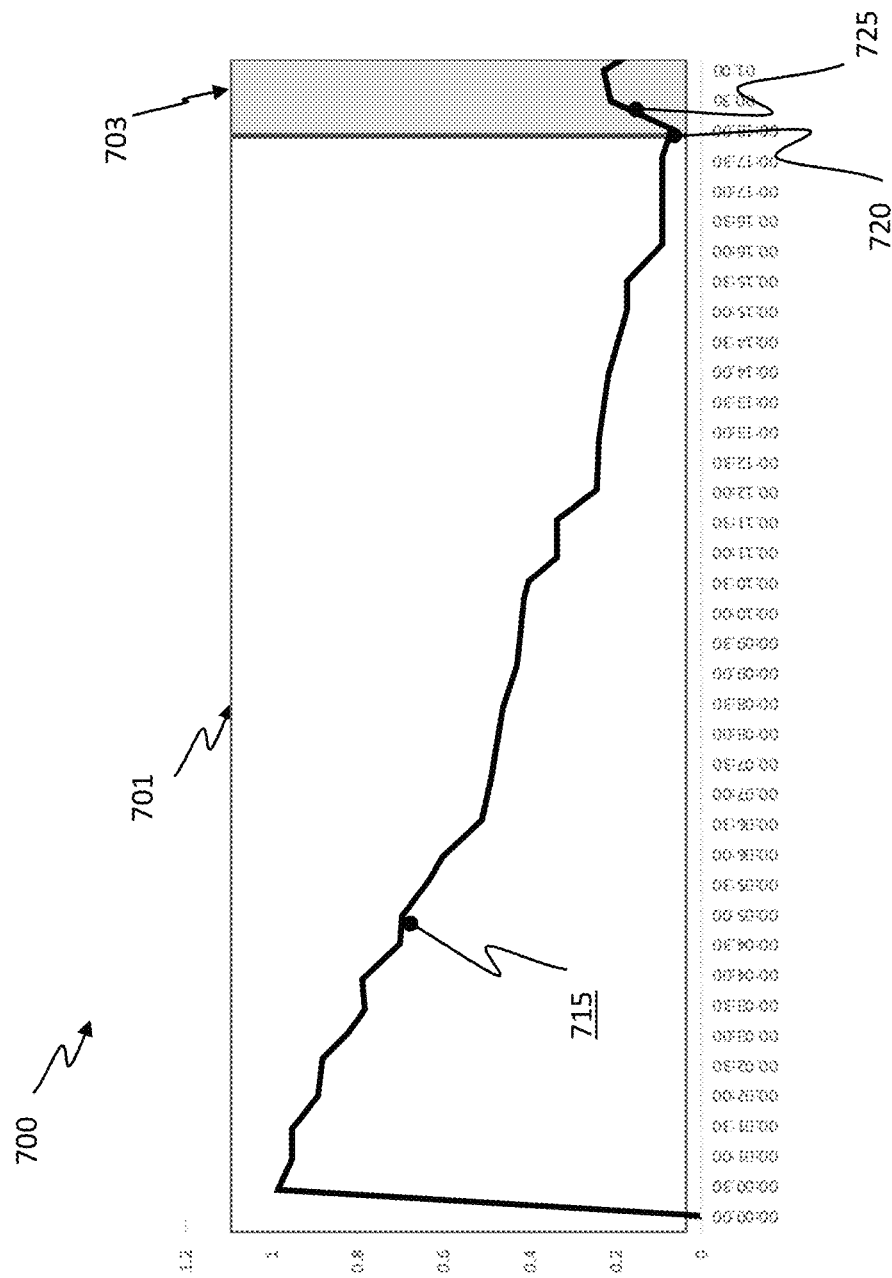
FIG. 7 depicts an exemplary remedial action to achieve the target emotion by affecting the emotion time series with an identified environmental factor, in accordance with one or more embodiments set forth herein.

FIG. 7 depicts an exemplary remedial action to achieve the target emotion by affecting the emotion time series with an identified environmental factor, in accordance with one or more embodiments set forth herein.

As noted in block 230, the emotion service engine 130 predicts a path to the target emotion at a certain time as specified in the target emotion-time value pair 150 based on the emotion time series modeled in block 220 regression analysis and modeling. The emotion service engine 130 identifies which environmental factor affects the progression of the emotion time series, during the regression analysis and modeling in block 410. The emotion service engine 130 also formulates, in block 440, a degree of contribution to a specific basic emotion by each identified environmental factor.

In the same embodiment as where the emotion service engine 130 modeled the Basic Emotion Time Series: Joy 510, the emotion service engine 130 collects input data 113, 117, and models an application-emotion time series graph 700 that represents a pattern of varying state of joy on the user 105, as respective emotion scores, over a certain period of time while using a chat application program. The emotion service engine 130 can perform regression analysis on all the environmental factor data 117 in order to identify all environmental factors affecting the state of emotions of the user 105, or the subject population 103. Examples of the environmental factors that are likely to affect the state of emotion include, but are not limited to, respective application programs which the user 105 is presently using, a location of the user 105, as represented in a GPS coordinate, in and around the serviced environment 101, time of the day, day of the week, season in a year, weather, and a noise level in the serviced environment 101.

As noted above, the emotion service engine 130 formulates the application-emotion time series graph 700 based on the result of regression analysis, specifying how the use of the respective applications affects the state of emotion. For the purpose of this example, the emotion service engine 130 models the states of emotion as responding to the one factor of the kind of application program in use. In other embodiments, the emotion service engine 130 can model the same state of emotions as responding to multiple factors that have similar patterns that would not cancel respective effects of other factors out in the emotion time series model.

The application-emotion time series graph 700 in a first area 701 is for a chat application, which represents a decreasing emotion score over time for the duration between "0:00:00" and "0:18:00", which indicates that using the chat application program has a negative effect on the emotion score. A first point 715 on the application-emotion time series graph 700 from the first area 701 represents an emotion score calculated from measured values of inputs. A second point 720 represents a current time, and any depiction on the right side of the second point 720, including a third point 725, are forecasted points based on one or more emotion time series model built from regression analysis on respective environmental factors.

The emotion service engine 130 previously identified that the application-emotion time series graph 700 for an email application demonstrated positive effects on emotion scores, resulting in an increasing emotion score over time on a second area 703 of the application-emotion time series graph 700. Accordingly, the emotion service engine use the negative weighting as a drift component of the emotion time series for predicting future emotion scores over time, in order to improve precision of the predicted emotion score. Typically, unbiased formulation without a drift component is less accurate in predicting a future value than a formulation biased with the drift component. Such models are usually referred to as an ARIMA(p, d, q) process with drift, where ARIMA stands for autoregressive integrated moving average, and where parameters p, d, and q are non-negative integers, p is the order (number of time lags) of the autoregressive model, d is the degree of differencing (the number of times the data have had past values subtracted), and q is the order of the moving average model.

The emotion service engine 130 predicts, at the present time marked "0:18:00" represented by the second point 720, an increased emotion score, for example, the third point 725, based on the model of the application-emotion time series graph 700 for the email application. An example of formula to calculate the emotion score based on regression analysis of the inputs is presented in FIG. 6 and corresponding description. If the target emotion-time value pair 150 indicates an emotion score greater than zero (0) at the present time represented by the second point 720, marked with a timestamp "00:18:00", then the emotion service engine 130 recommends the user 105 to use the email application program instead of the chat application program, in order to improve the emotion score at the time represented by the third point 725, marked with a timestamp "00:30", indicating thirty (30) minutes from the present time "00:18:00".

Certain embodiments of the present invention may offer various technical computing advantages, including the use of natural language understanding tool and/or topic modeling in quantifying various individual outputs as emotion score. By performing regression analysis, one or more environmental factor affecting changes in states of emotion on a person, or cumulatively a group of people, is identified. The emotion time series model is built per environmental factor for prediction of future changes in the state of emotion of the subject person or group and for recommending certain activities to attain a desired state of emotion in the future. Mean average time lapse of changes in the states of emotion as represented in respective emotion scores at different times is statistically simulated. Mean interval of occurrences of a certain environmental factor, or mean duration of a certain environmental factor is also statistically simulated. Certain embodiments of the present invention include the emotion knowledgebase that stores information on activities to recommend to the subject user or group, in order to attain the desired state of emotion. Certain embodiments of the present invention, receives feedback and recommendation and trains the emotion time series models respective to environmental factors, for individual users or for a group, by machine learning. Certain embodiments of the present invention may be implemented by use of a cloud platform/data center in various types including a Software-as-a-Service (SaaS), Platform-as-a-Service (PaaS), Database-as-a-Service (DBaaS), and combinations thereof based on types of subscription. The user assistance service as described herein can be provided for subscribed business entities in need from any location in the world.

Figure 8:
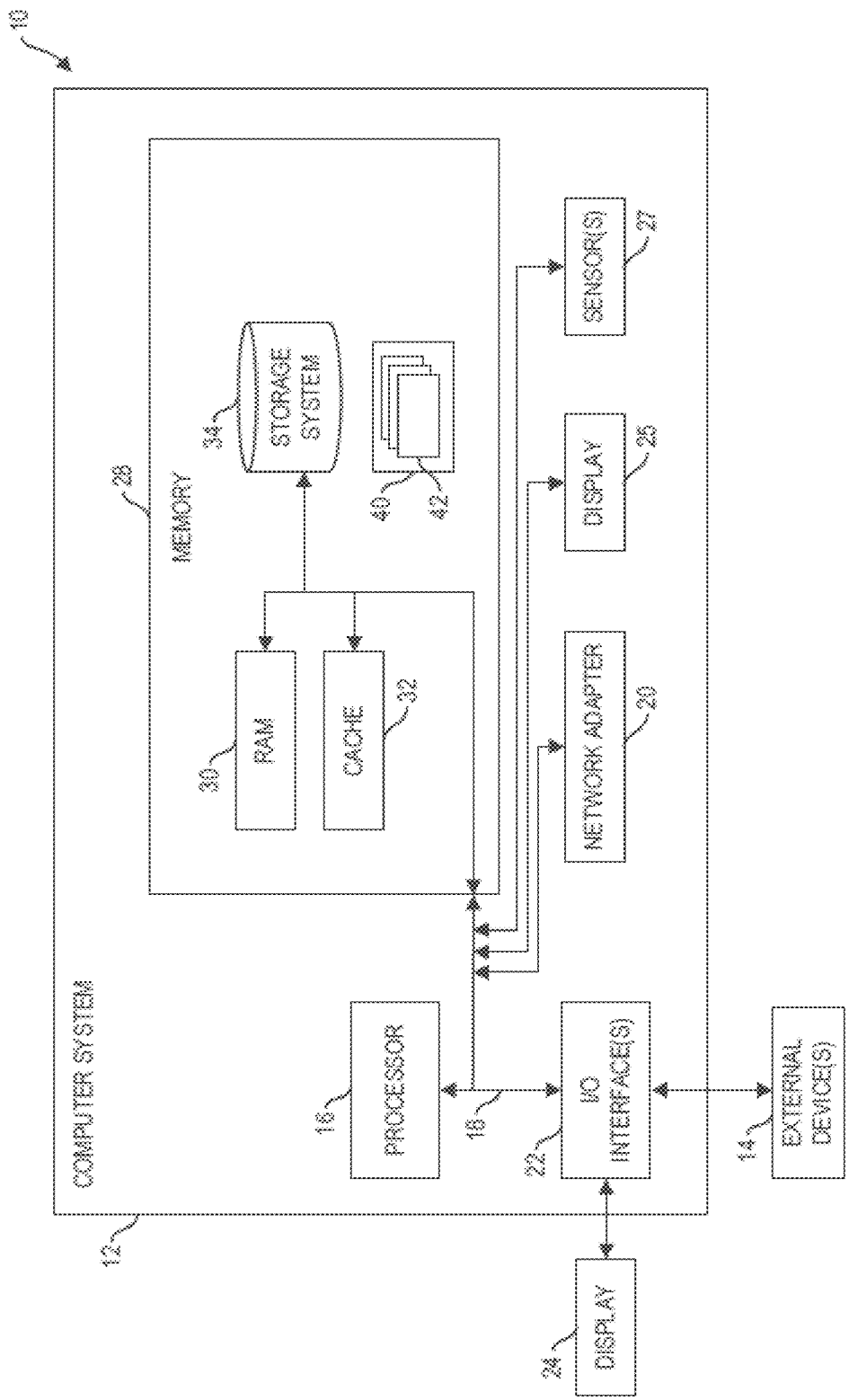
FIG. 8 depicts a cloud computing node according to an embodiment of the present invention.
Figure 9:
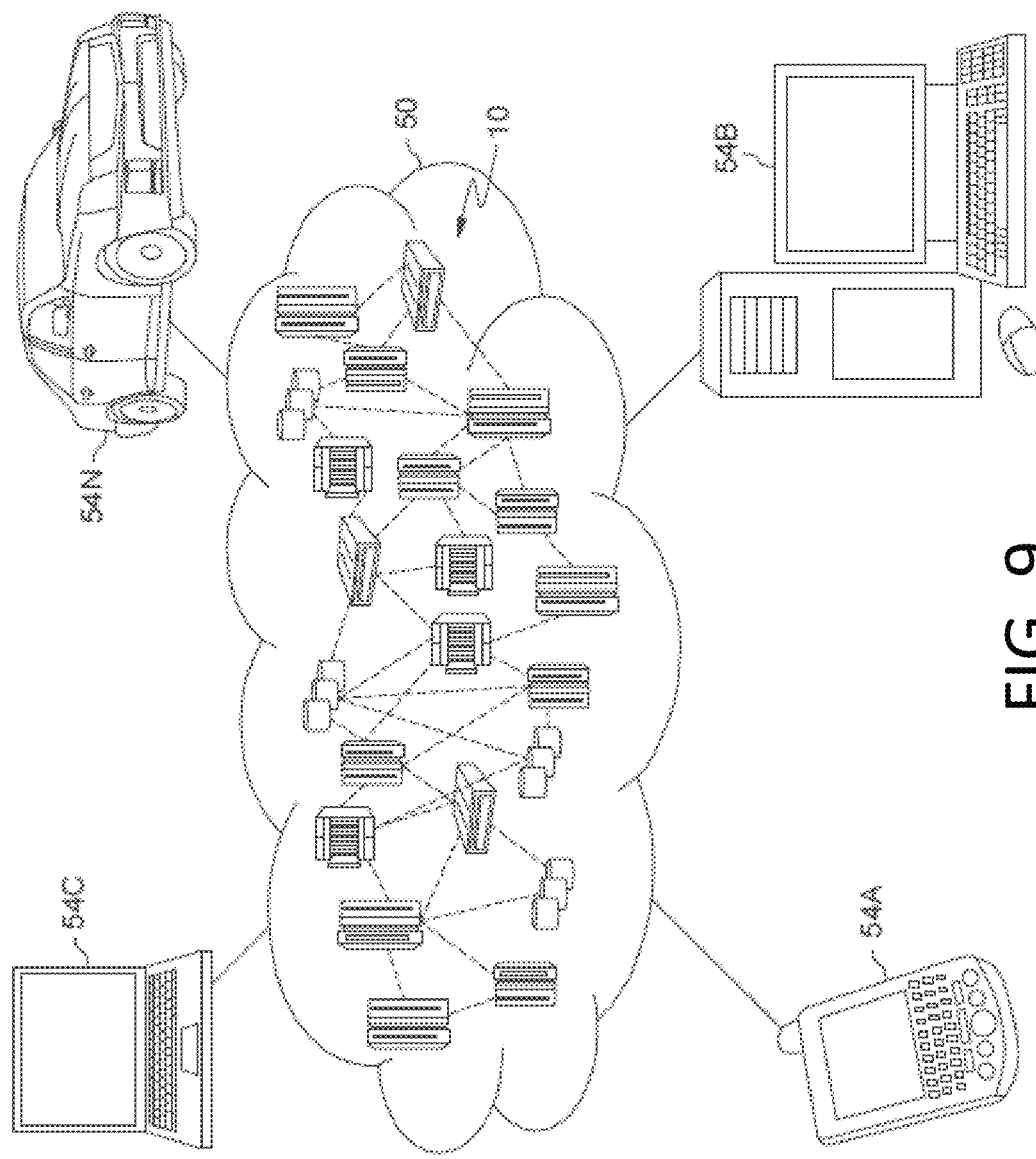
FIG. 9 depicts a cloud computing environment according to an embodiment of the present invention.
Figure 10:
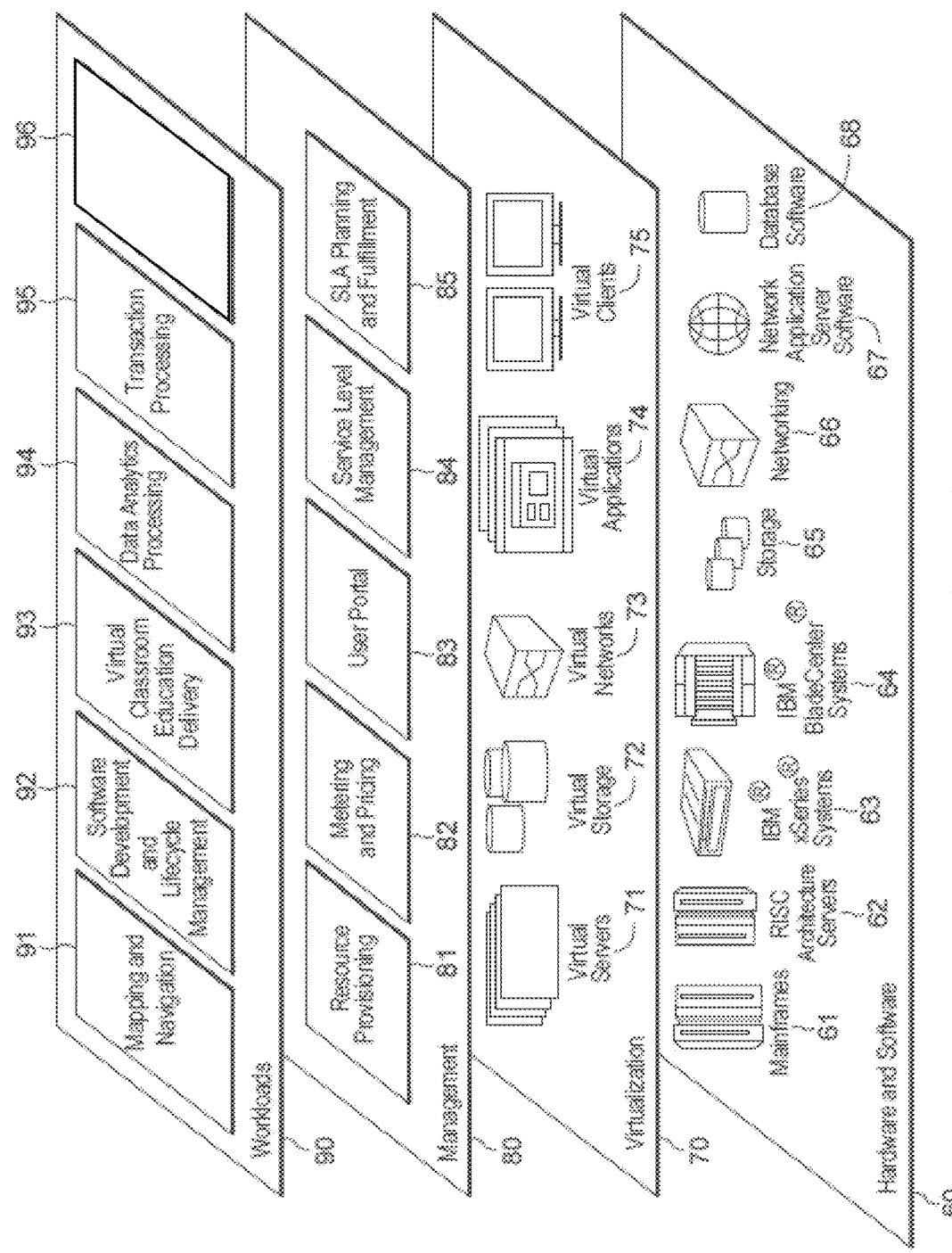
FIG. 10 depicts abstraction model layers according to an embodiment of the present invention.

FIGS. 8-10 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 8, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 8, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile memory device (e.g., a "thumb drive", "external hard drive"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the user assistance service system 120 and the emotion service engine 130 of FIG. 1, respectively. Program processes 42, as in the emotion service engine 130 of the user assistance service system 120 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18.

In addition to or in place of having external devices 14 and the display 24, which can be configured to provide user interface functionality, computing node 10 in one embodiment can include another display 25 connected to bus 18. In one embodiment, the display 25 can be configured as a touch screen render and can be configured to provide user interface functionality, e.g. can facilitate virtual keyboard functionality and input of total data. Computer system 12 in one embodiment can also include one or more sensor device 27 connected to bus 18. One or more sensor device 27 can alternatively or in addition be connected through I/O interface(s) 22. The one or more sensor device 27 can include a Global Positioning Sensor (GPS) device in one embodiment and can be configured to provide a location of computing node 10. In one embodiment, the one or more sensor device 27 can alternatively or in addition include, e.g., one or more of a camera, a gyroscope, a temperature sensor, a humidity sensor, a pulse sensor, a blood pressure (BP) sensor or an audio input device.

It should be understood that although not shown, other hardware and/or software components could be used in conjunction with computer system 12 in cloud computing node 10. Examples, include, but are not limited to: microcode, device drivers, redundant processors, external disk drive arrays, RAID systems, tape drives, and data archival storage systems, etc.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the user assistance services by modeling emotion time series as provided by the user assistance service system and by the emotion service engine 96, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method, comprising:
   obtaining, by one or more processor, inputs of emotion time series data of a user and environmental factor data from one or more data collection device for a user assistance service;
   generating, by the one or more processor, a baseline emotion time series based on the inputs from the obtaining;
   ascertaining, by the one or more processor, one or more environmental factor affecting states of emotion as represented in the emotion time series by regression analysis;
   building, by the one or more processor, an emotion time series model for one of the one or more environmental factor from the ascertaining;
   predicting, by the one or more processor, one or more path to a target state of emotion at a target time in the future on the emotion time series model; and
   producing, by the one or more processor, a recommendation specifying one or more activity to perform for the user in order to attain the target state of emotion at the target time.

2. The computer implemented method of claim 1, further comprising:
   obtaining feedback on the one or more activity in the recommendation from the user and updated emotion time series data of the user, subsequent to the user had performed the one or more activity according to the recommendation; and
   training the emotion time series model with the feedback and the updated emotion time series data from the obtaining.

3. The computer implemented method of claim 1, the generating comprising:
   calculating an emotion score corresponding to each instance of the obtained emotion time series data according to a preconfigured scale.

4. The computer implemented method of claim 1, the generating comprising
   classifying the obtained emotion time series data into a preconfigured category per each basic emotion, by modeling any linguistic expression from the obtained emotion time series data by topic.

5. The computer implemented method of claim 1, the building comprising:
   modeling, by use of probability density function, an average interval between occurrences of events in an environmental factor from the ascertaining;
   modeling, by use of standard distribution, a mean time lapse between changes in states of emotion;
   formulating, by use of logit function, a log probability of the one or more environmental factor; and
   identifying any drift component in a formula for the log probability from the formulating.

6. The computer implemented method of claim 1, wherein the one or more activity in the recommendation includes, but is not limited to, activities known to promote a relaxed and positive state of emotion, specifically for the user or for general public having demographic similar to the user, and wherein the one or more activity is stored in an emotion knowledge base.

7. The computer implemented method of claim 1, wherein the emotion time series data include, but are not limited to, emails, chat texts, blood pressure measurements, heartrate measurements, voice stress levels, and facial images, of or authored by the user.

8. The computer implemented method of claim 1, wherein the environmental factor data includes an application program which the user is using.

9. The computer implemented method of claim 1, wherein the environmental factor data includes a location of the user.

10. The computer implemented method of claim 1, wherein the environmental factor data includes an application program which the user is using, a location that the user is using, scheduled events of the user.

11. The computer implemented method of claim 1, wherein the one or more activity in the recommendation includes, but is not limited to, activities known to promote a relaxed and positive state of emotion, specifically for the user or for general public having demographic similar to the user, wherein the one or more activity is stored in an emotion knowledge base, and wherein the emotion time series data include, emails, chat texts, blood pressure measurements, heartrate measurements, voice stress levels, and facial images, of or authored by the user.

12. The computer implemented method of claim 1, further comprising:
   obtaining feedback on the one or more activity in the recommendation from the user and updated emotion time series data of the user, subsequent to the user had performed the one or more activity according to the recommendation; and
   training the emotion time series model with the feedback and the updated emotion time series data from the obtaining, wherein the generating comprises calculating an emotion score corresponding to each instance of the obtained emotion time series data according to a preconfigured scale.

13. The computer implemented method of claim 1, further comprising:
   obtaining feedback on the one or more activity in the recommendation from the user and updated emotion time series data of the user, subsequent to the user had performed the one or more activity according to the recommendation; and
   training the emotion time series model with the feedback and the updated emotion time series data from the obtaining, wherein the generating comprises classifying the obtained emotion time series data into a preconfigured category per each basic emotion, by modeling any linguistic expression from the obtained emotion time series data by topic.

14. The computer implemented method of claim 1, further comprising:
   obtaining feedback on the one or more activity in the recommendation from the user and updated emotion time series data of the user, subsequent to the user had performed the one or more activity according to the recommendation; and
   training the emotion time series model with the feedback and the updated emotion time series data from the obtaining, wherein the generating comprises calculating an emotion score corresponding to each instance of the obtained emotion time series data according to a preconfigured scale, and classifying the obtained emotion time series data into a preconfigured category per each basic emotion, by modeling any linguistic expression from the obtained emotion time series data by topic.

15. The computer implemented method of claim 1, further comprising:
   obtaining feedback on the one or more activity in the recommendation from the user and updated emotion time series data of the user, subsequent to the user had performed the one or more activity according to the recommendation; and training the emotion time series model with the feedback and the updated emotion time series data from the obtaining, wherein the generating comprises calculating an emotion score corresponding to each instance of the obtained emotion time series data according to a preconfigured scale, and classifying the obtained emotion time series data into a preconfigured category per each basic emotion, by modeling any linguistic expression from the obtained emotion time series data by topic, wherein the building comprises modeling, by use of probability density function, an average interval between occurrences of events in an environmental factor from the ascertaining; modeling, by use of standard distribution, a mean time lapse between changes in states of emotion;

formulating, by use of logit function, a log probability of the one or more environmental factor; and identifying any drift component in a formula for the log probability from the formulating, wherein the one or more activity in the recommendation includes activities known to promote a relaxed and positive state of emotion, specifically for the user or for general public having demographic similar to the user, and wherein the one or more activity is stored in an emotion knowledge base.

16. The computer implemented method of claim 1, further comprising:

obtaining feedback on the one or more activity in the recommendation from the user and updated emotion time series data of the user, subsequent to the user had performed the one or more activity according to the recommendation; and training the emotion time series model with the feedback and the updated emotion time series data from the obtaining, wherein the generating comprises calculating an emotion score corresponding to each instance of the obtained emotion time series data according to a preconfigured scale, and classifying the obtained emotion time series data into a preconfigured category per each basic emotion, by modeling any linguistic expression from the obtained emotion time series data by topic, wherein the building comprises modeling, by use of probability density function, an average interval between occurrences of events in an environmental factor from the ascertaining; modeling, by use of standard distribution, a mean time lapse between changes in states of emotion;

formulating, by use of logit function, a log probability of the one or more environmental factor; and identifying any drift component in a formula for the log probability from the formulating, wherein the one or more activity in the recommendation includes activities known to promote a relaxed and positive state of emotion, specifically for the user or for general public having demographic similar to the user, and wherein the one or more activity is stored in an emotion knowledge base, and wherein the emotion time series data include emails, chat texts, blood pressure measurements, heartrate measurements, voice stress levels, and facial images, of or authored by the user.

17. The computer implemented method of claim 1, wherein the one or more activity in the recommendation includes activities known to promote a relaxed and positive state of emotion, specifically for the user or for general public having demographic similar to the user, and wherein the one or more activity is stored in an emotion knowledge base.

18. The computer implemented method of claim 1, wherein the emotion time series data include emails, chat texts, blood pressure measurements, heartrate measurements, voice stress levels, and facial images, of or authored by the user.

\* \* \* \* \*